(12) United States Patent
Kuo et al.

(10) Patent No.: US 11,173,637 B2
(45) Date of Patent: Nov. 16, 2021

(54) FORMING MOLD WITH LINKAGE TYPE LATERAL AUXILIARY PRESSURIZATION

(71) Applicant: National Kaohsiung University of Science and Technology, Kaohsiung (TW)

(72) Inventors: Chun-Chih Kuo, Kaohsiung (TW); Tse-Chang Li, Kaohsiung (TW); Dai-You Wu, Kaohsiung (TW); Cheng-Yu Yang, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 0 days.

(21) Appl. No.: 16/585,401

(22) Filed: Sep. 27, 2019

(65) Prior Publication Data

US 2020/0406512 A1 Dec. 31, 2020

(30) Foreign Application Priority Data

Jun. 25, 2019 (TW) .................................. 108122141

(51) Int. Cl.
*B29C 43/36* (2006.01)
*B29C 43/10* (2006.01)

(52) U.S. Cl.
CPC ............ *B29C 43/361* (2013.01); *B29C 43/10* (2013.01); *B29C 43/3642* (2013.01); *B29C 2043/3615* (2013.01); *B29C 2043/3649* (2013.01)

(58) Field of Classification Search
CPC .... B29C 2043/3649; B29C 2043/3615; B29C 2043/361
See application file for complete search history.

(56) References Cited

FOREIGN PATENT DOCUMENTS

| CN | 202061980 U | * | 12/2011 | |
|---|---|---|---|---|
| CN | 105881850 B | * | 8/2016 | |
| CN | 207206933 U | * | 4/2018 | |
| CN | 207839723 U | * | 9/2018 | |
| KR | 20140021806 A | * | 2/2014 | ......... B29C 45/4435 |

* cited by examiner

*Primary Examiner* — Joseph S Del Sole
*Assistant Examiner* — Ariella Machness
(74) *Attorney, Agent, or Firm* — WPAT, PC (57) ABSTRACT

The present disclosure includes a mold base set, a forming mold core, a rubber pad or a rubber bladder, and a lateral pressure mechanism, wherein the mold base set includes a first mold base and a second mold base, and the second mold base has a mounting part; the forming mold core is arranged on the first mold base; the rubber pad is arranged on the mounting part, and the base surface and side wall surface of the sheet are molded during mold assembly of the mold base set; and the lateral pressure mechanism includes a slope fixed block fixed to the first mold base and a slope slide block set arranged on the second mold base.

14 Claims, 9 Drawing Sheets

FIG. 1

Prior art

FIG. 7 ial Field

FORMING MOLD WITH LINKAGE TYPE LATERAL AUXILIARY PRESSURIZATION

BACKGROUND

Technical Field

The present invention relates to an upper and lower assembled forming mold of a rubber pad or a rubber bladder, and particularly relates to a forming mold with linkage type lateral auxiliary pressurization.

Related Art

Figure 1:
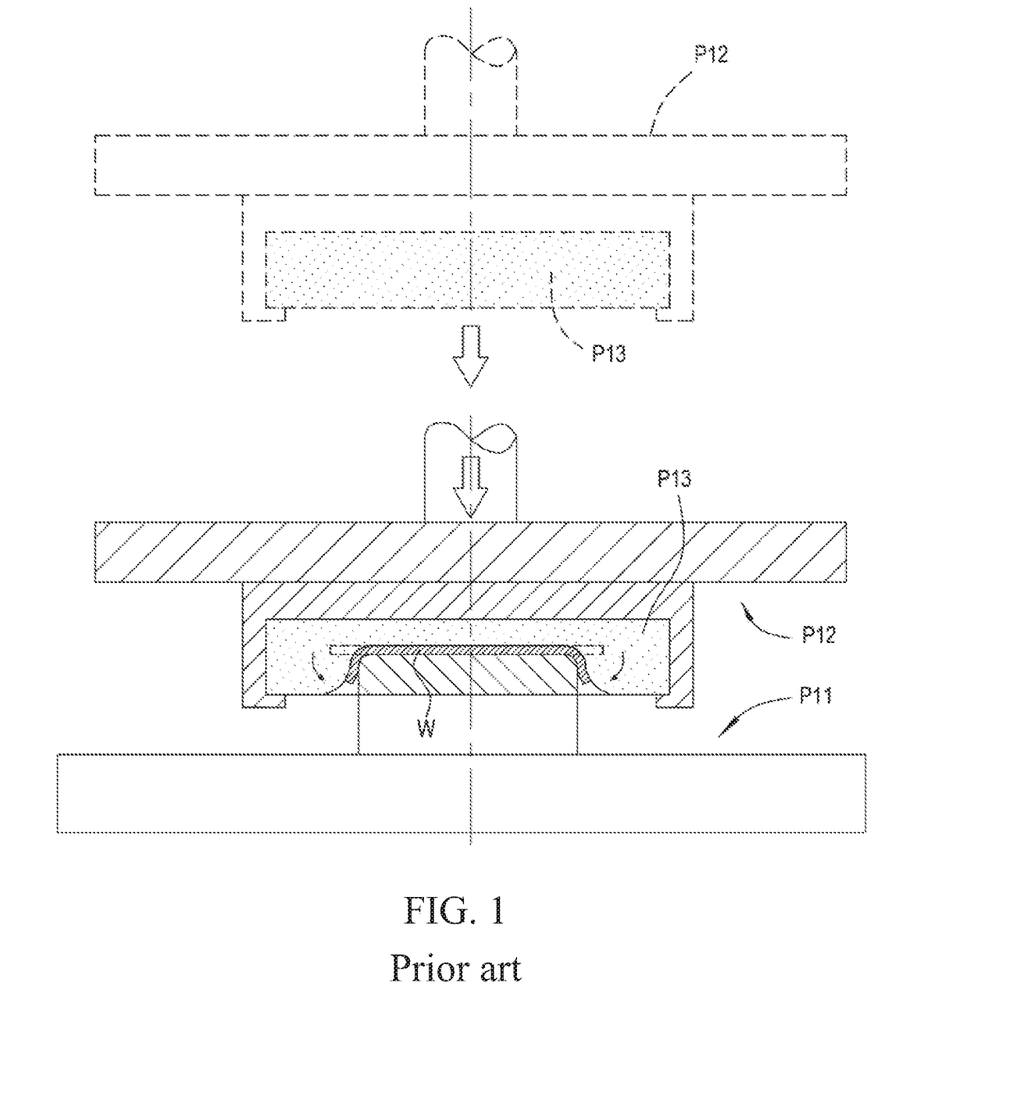
FIG. 1 is a cross-sectional schematic diagram of assembly of a rubber pad forming mold in the prior art.

Rubber pad forming or rubber bladder hydraulic forming is one of the main forming methods for sheet parts, and has the advantages of high efficiency, good surface quality of formed parts, low noise during forming, and the like. As shown in FIG. 1, the rubber pad forming is mainly characterized in that rubber arranged on an upper mold base is used as an elastic concave mold, high-pressure internal stress generated when the rubber is compressed is used as a pressure transfer medium, and under the action of pressure, a metal sheet is gradually formed with a rigid convex mold; and the rubber bladder hydraulic forming is mainly characterized in that a rubber bladder filled with liquid is used as an elastic concave mold, high-pressure internal stress generated when the rubber bladder is compressed is used as a pressure transfer medium, and under the action of pressure, a metal sheet is gradually formed with a rigid convex mold.

During rubber pad forming or rubber bladder hydraulic forming, although a pressurization force of mold pressing can be utilized to generate pressure in an assembly direction and a lateral component force forming an included angle with the assembly direction for a rubber pad or a rubber bladder so as to enable the side wall of the metal sheet to be concavely bent, the larger the included angle is, the smaller the lateral component force of the assembly pressure acting on the rubber pad or the rubber bladder (as shown in FIG. 1), causing high rebound force of the side wall of the metal sheet and further causing an unobvious forming effect.

SUMMARY

The present invention is directed to a forming mold for assembling, pressurizing and forming a sheet, and the assembly power is utilized to link a lateral auxiliary pressurization mechanism so as to apply a larger lateral pressurization force to the sheet.

In order to achieve the objective, the present invention provides a rubber pad forming mold with linkage type lateral auxiliary pressurization, used for forming a sheet including a base surface and a side wall surface bent at an angle to the base surface. The forming mold includes: a mold base set, comprising a first mold base and a second mold base, wherein the first mold base and the second mold base can be mutually assembled to mold the sheet and can be mutually split to take out the sheet, and the surface of the second mold base facing the first mold base is provided with a mounting part; a forming mold core, arranged on the first mold base corresponding to the mounting part, wherein the forming mold core is provided with a base surface part and a side surface part bent at an angle to the base surface part, and the base surface part is used for placement of the sheet; a rubber pad, arranged on the mounting part, wherein the area occupied by the rubber pad covers the surface region of the sheet facing the rubber pad, and during assembly forming of the mold base set, the sheet and the forming mold core are sunken in the rubber pad to mold the sheet comprising the base surface and the side wall surface; and a lateral pressure mechanism, comprising a plurality of slope fixed blocks fixed to the first mold base and slope slide block sets arranged on the second mold base and corresponding to the slope fixed blocks, wherein each slope fixed block has a fixed slope, each slope slide block set comprises a slide rail groove and a slope slide block moving in the slide rail groove, the slope slide block is provided with a lateral slide surface corresponding to the fixed slope and a working surface, and during assembly of the mold base set, the lateral slide surface abuts against the fixed slope, and a pressurization force of the assembled mold is utilized to enable the skew component force of the fixed slope of the slope fixed block to act on the slope slide block so as to enable the working surface to move towards the rubber pad at the side wall part, so that a pressurization force is applied to the rubber pad and is transferred to the side wall of the sheet.

In an embodiment, the first mold base is an upper mold base, and the second mold base is a lower mold base.

In an embodiment, the second mold base is provided with a ring wall surrounding the mounting part, the rubber pad is arranged in the region surrounded by the ring wall, and the ring wall is provided with an opening for the working surface to pass through in a position corresponding to the working surface.

In an embodiment of the rubber pad forming mold, the lateral slide surface of each slope slide block is a screwed oil-free wear-resistant block, and the angle of the lateral slide surface can be finely adjusted during screwing.

In an embodiment of the rubber pad forming mold, each fixed slope is a screwed oil-free wear-resistant block, and the angle of the fixed slope can be finely adjusted during screwing.

In an embodiment of the rubber pad forming mold, the height of each slope fixed block relative to the first mold base to which the screwed is screwed can be adjusted during screwing.

In order to achieve the objective, the present invention further provides a hydraulic forming mold with linkage type lateral auxiliary pressurization, used for forming a sheet comprising a base surface and a side wall surface bent at an angle to the base surface. The forming mold includes: a mold base set, comprising a first mold base (lower-fixed) and a second mold base (upper-moving), wherein the first mold base and the second mold base can be mutually assembled to mold the sheet and can be mutually split to take out the sheet, the surface of the second mold base facing the first mold base is provided with a mounting part, a ring wall is arranged around the mounting part, and the ring wall is provided with an opening; a forming mold core, arranged on the first mold base corresponding to the mounting part, wherein the forming mold core has a base surface part and a side surface part bent at an angle to the base surface part, and the base surface part is used for placement of the sheet; a rubber bladder for containing liquid, arranged on the mounting part, wherein the area occupied by the rubber bladder covers the surface region of the sheet facing the rubber bladder, and during assembly forming of the mold base set, the sheet and the forming mold core are sunken in the rubber bladder to mold the sheet comprising the base surface and the side wall surface; and a lateral pressure mechanism, comprising a plurality of slope fixed blocks fixed to the first mold base and slope slide block sets arranged on the second mold base and corresponding to the slope fixed blocks, wherein each slope fixed block has a fixed slope, each slope slide block set comprises a slide rail groove and a slope slide block, a pedestal of the slope slide block moves relative to the slide rail groove in the slide rail groove, the slope slide block is provided with a lateral slide surface corresponding to the fixed slope and a working surface, and during assembly of the mold base set, the lateral slide surface abuts against the fixed slope, and the pressurization force of the assembled mold is utilized to enable the skew component force of the fixed slope of the slope fixed block to act on the slope slide block so as to enable the working surface to move towards the rubber bladder at the side wall part and pass through the opening of the ring wall corresponding to the working surface, so that a pressurization force is applied to the rubber bladder and is transferred to the side wall of the sheet.

In an embodiment of the hydraulic forming mold, the first mold base is an upper mold base, and the second mold base is a lower mold base.

In an embodiment of the hydraulic forming mold, the lateral slide surface of each slope slide block is a screwed oil-free wear-resistant block, and the angle of the lateral slide surface can be finely adjusted during screwing.

In an embodiment of the hydraulic forming mold, each fixed slope is a screwed oil-free wear-resistant block, and the angle of the fixed slope can be finely adjusted during screwing.

In an embodiment of the hydraulic forming mold, the height of each slope fixed block relative to the first mold base to which the slope fixed block is screwed can be adjusted during screwing.

The present invention has the following characteristics: during pressing of the mold base set, a lateral pressurization force is generated and can provide better formability to the lateral bending of a machined part (sheet); the hydraulic pressure for pressing the mold base set is utilized to link a bevel sliding type lateral auxiliary pressurization mechanism arranged on the mold base set, so that during pressing of the mold base set, a lateral pressurization force is simultaneously generated, additional power is not needed, and the environmental friendliness is realized; the slope angle converting the vertical pressurization force into the horizontal lateral pressurization force can be modularly changed to different angles and heights (relative to the first mold base) of the slope fixed blocks can be modularly change, i.e., vertical and horizontal slide ratios and the lateral strokes of the slope slide blocks can be adjusted so as to change the magnitude of the lateral pressurization force; and the pressurization force of the assembled mold is utilized to enable the slope slide block to move towards the rubber pad at a side wall part, then a pressurization force is applied to a side surface of the rubber pad, and a lateral pressurization force is provided for molding a side wall surface of the sheet, so that the metal plate of the side wall surface can be better attached to the forming mold core to reduce the occurrence of crinkling or rebounding of the sheet.

DETAILED DESCRIPTION

The embodiments of the present invention are described in detail below with reference to the drawings. The drawings are mainly simplified schematic diagrams, and are only used for illustrating the basic structure of the present invention in a schematic manner. Therefore, only elements related to the present invention are labeled in the drawings, the shown elements are not drawn in terms of number, shape, size and the like during implementation, the size during actual implementation is a selective design, and the element layout form may be more complicated.

Referring to FIG. 2, FIG. 3A, FIG. 3B, FIG. 3C, FIG. 4A, and FIG. 4B, a rubber pad forming mold 1 with linkage type lateral auxiliary pressurization of the present embodiment is used for forming a sheet W, and the sheet W comprises a base surface W1 and a side wall surface W2 bent at an angle to the base surface W1. The rubber pad forming mold 1 includes a mold base set 11, a forming mold core 12, a rubber pad 13, and a lateral pressure mechanism 14.

Figure 2:
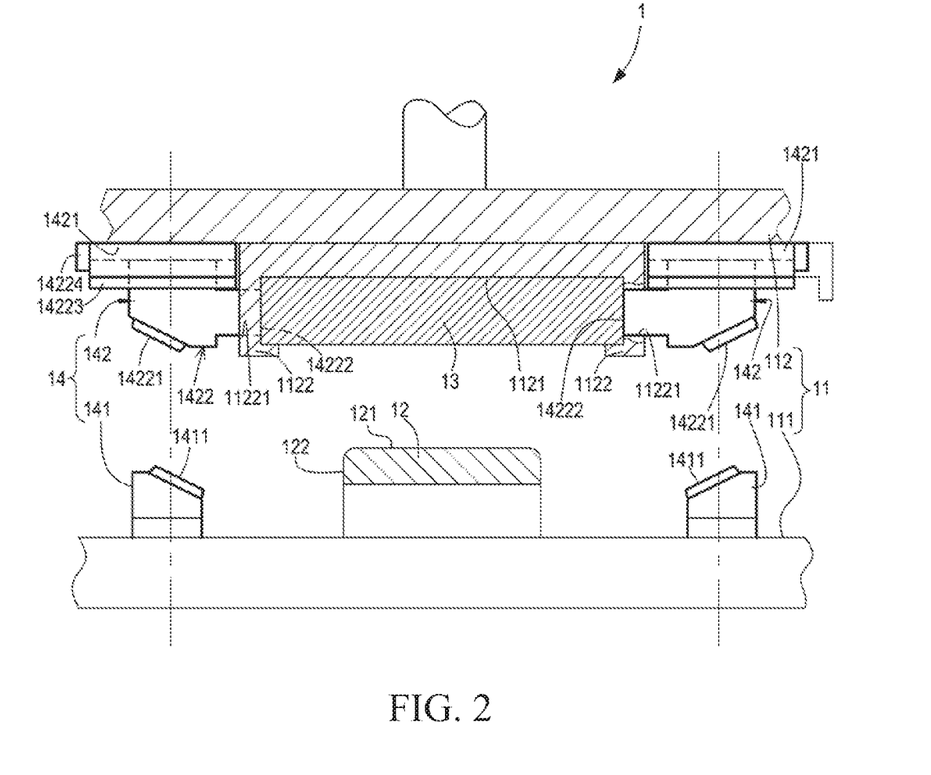
FIG. 2 is a schematic diagram of splitting of a rubber pad forming mold with linkage type lateral auxiliary pressurization of the present invention.
Figure 4A:
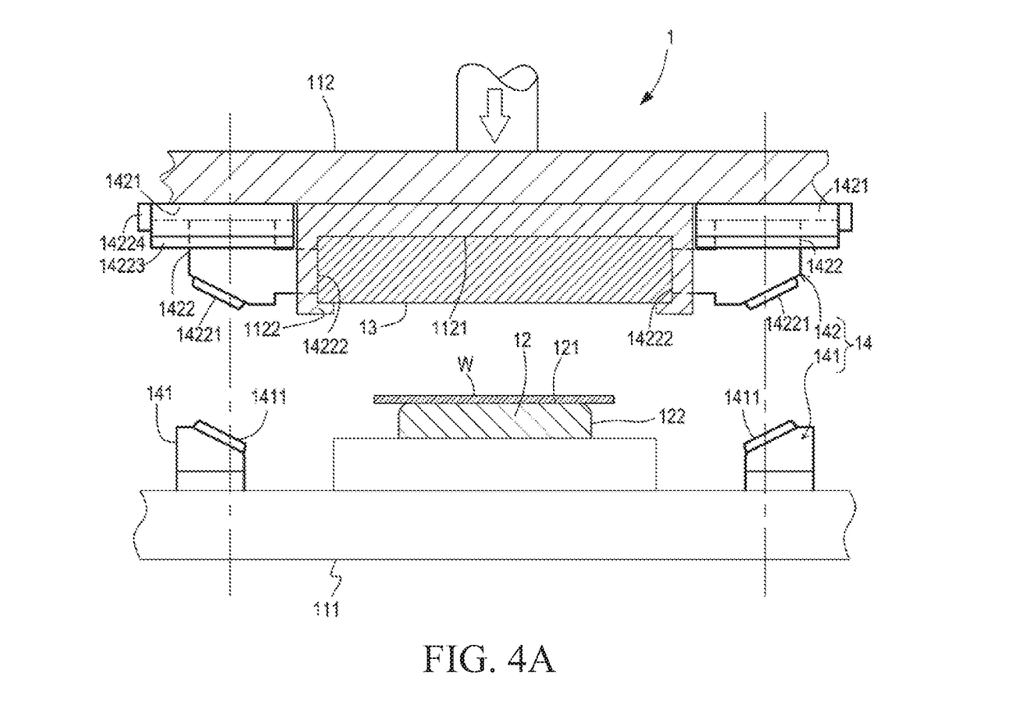
FIG. 4A is a front cross-sectional schematic diagram of a rubber pad forming mold with linkage type lateral auxiliary pressurization in a splitting and sheet placing state.

The mold base set 11 includes a first mold base 111 (as shown in FIG. 2 and FIG. 4A, a fixed lower mold base in the present embodiment) and a second mold base 112 (as shown in FIG. 2 and FIG. 4A, an upper mold base capable of downward moving towards the lower mold base or upward moving far away from the lower mold base in the present embodiment), where first mold base 111 and the second mold base 112 can be mutually assembled to mold the sheet W and can be mutually split to take out or embed the sheet W, and the surface of the second mold base 112 facing the first mold base 111 is provided with a mounting part 1121.

The forming mold core 12 is arranged on the first mold base 111 corresponding to the mounting part 1121, where the forming mold core 12 has a base surface part 121 and a side surface part 122 bent at an angle to the base surface part 121, and the base surface part 121 is used for placement of the sheet W.

The rubber pad 13 is arranged on the mounting part 1121, where the area occupied by the rubber pad 13 covers the surface region of the sheet W facing the rubber pad 13, and during assembly forming of the mold base set 11, the sheet W and the forming mold core 12 are sunken in the rubber pad 13, and an elastic recovery medium of the rubber pad 13 is used for transferring the pressure of multi-directional vectors to the sheet W so as to form a shape comprising the base surface W1 and the side wall surface W2.

Figure 3A:
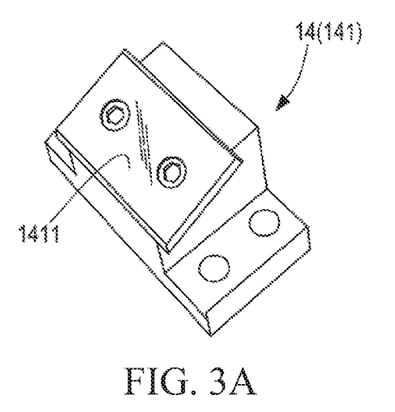
FIG. 3A is a three-dimensional diagram of a slope fixed block of a linkage type lateral auxiliary pressurization structure arranged on a forming mold of the present invention.
Figure 3B:
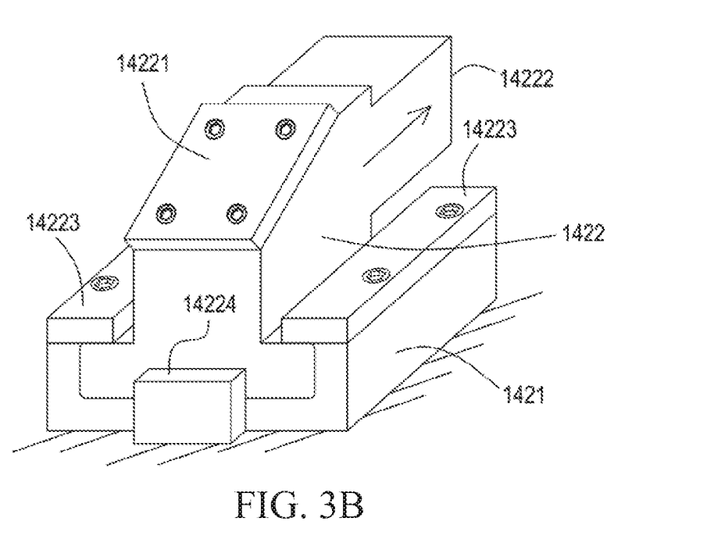
FIG. 3B is a three-dimensional diagram showing that a slope slide block of a slope slide block set of a linkage type lateral auxiliary pressurization structure arranged on a forming mold of the present invention moves towards a working direction.
Figure 3C:
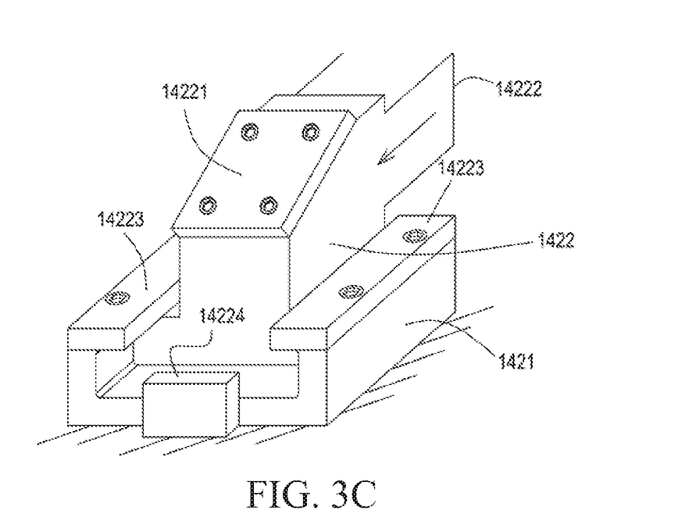
FIG. 3C is a three-dimensional diagram showing that a slope slide block of a slope slide block set of a linkage type lateral auxiliary pressurization structure arranged on a forming mold of the present invention moves opposite to a working direction.
Figure 4B:
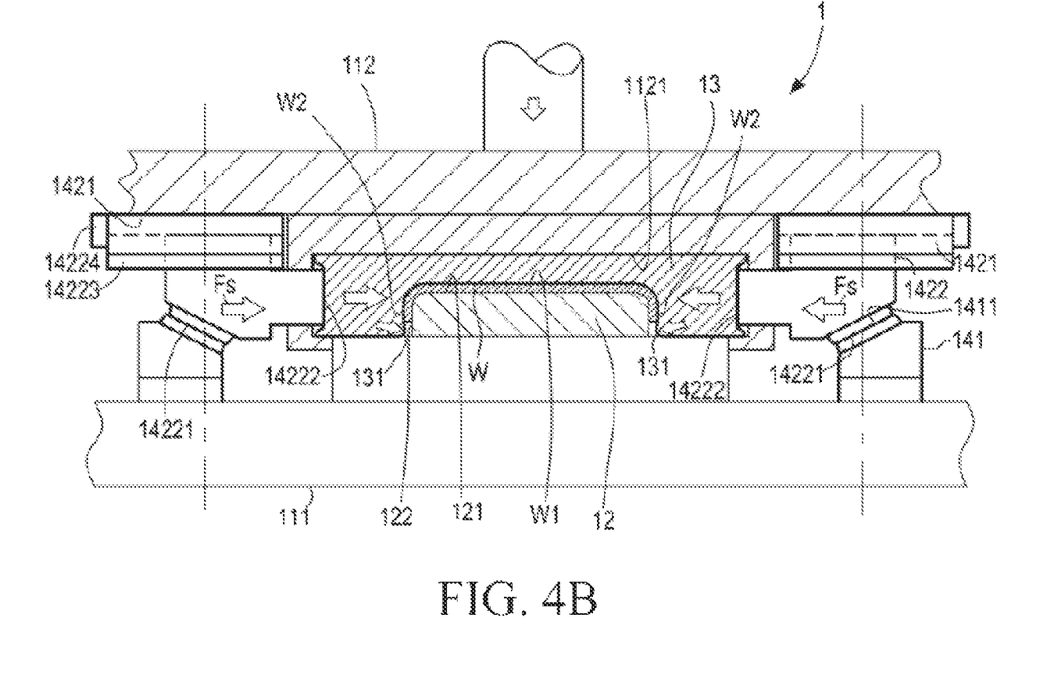
FIG. 4B is a front cross-sectional schematic diagram of a rubber pad forming mold with linkage type lateral auxiliary pressurization in an assembly molding, i.e. lateral pressure mechanism pressurization state.

The lateral pressure mechanism 14 comprises a plurality of slope fixed blocks 141 fixed to the first mold base 111 and slope slide block sets 142 arranged on the second mold base 112 and corresponding to the slope fixed blocks 141, where each slope fixed block 141 has a fixed slope 1411, each slope slide block set 142 comprises a slide rail groove 1421 and a slope slide block 1422, a pedestal of the slope slide block 1422 can move relative to the slide rail groove 1421 in the slope slide block 1422. A specific method is as shown in FIG. 3B and FIG. 3C: a shoulder can be extended from the bottom of the slope slide block 1422 to form a wider pedestal, and the pedestal is arranged in the slide rail groove 1421 and is locked to the tops of two sides of the slide rail groove 1421 respectively by a slide block pressure plate 14223 so as to limit the pedestal to move only along the axial direction of the slide rail groove 1421; and furthermore, in order to prevent the slope slide block 1422 from separating out of the end surface of the slide rail groove 1421, a slide block baffle plate 14224 can be arranged on the end surface of the slide rail groove 1421 so as to limit the extreme position of the slope slide block 1422 moving in the slide rail groove 1421. The top of the slope slide block 1422 has a lateral slide surface 14221 corresponding to the fixed slope 1411 and a working surface 14222 for applying pressure. During assembly of the mold base set 11, the lateral slide surface 14221 approaches the fixed slope 1411 and is in contact with and abuts against the fixed slope 1411, a pressurization force of the assembled mold is utilized to enable the mold base set 11 to be pressed, the skew component force of the fixed slope 1411 of the slope fixed block 141 acts on the slope slide block 1422 to enable the working surface 14222 to move towards the rubber pad 13, and a pressurization force Fs (as shown in FIGS. 4A to 4B) is applied to the rubber pad 13 and is transferred to the side wall surface W2 of the sheet W. In this case, as shown in FIG. 4B, the pressurization force Fs is applied to the rubber pad 13, so that a tail edge facing the side wall surface W2 is formed, and a collapse deformation state is formed.

In a rubber pad forming embodiment, the first mold base 111 can be used as an upper mold base, and the second mold base 112 can be used as a lower mold base.

In a rubber pad forming embodiment, the second mold base 112 is provided with a ring wall 1122 surrounding the mounting part 1121, the rubber pad 13 is arranged in the region surrounded by the ring wall 1122, and the ring wall 1122 is provided with an opening 11221 for the working surface 14222 to pass through in a position corresponding to the working surface 14222.

In a rubber pad forming embodiment, the lateral slide surface of each slope slide block 1422 is a screwed oil-free wear-resistant block, and the angle of the lateral slide surface can be finely adjusted during screwing.

In the above rubber pad forming embodiment, each fixed slope 1411 is a screwed oil-free wear-resistant block, and the angle of the fixed slope 1411 can be finely adjusted during screwing.

In a rubber pad forming embodiment, the fixed slopes 1411 of the slope fixed blocks 141 and the lateral slide surfaces 14221 of the slope slide blocks 1422 can be changed or adjusted to other different inclination angles so as to change the ratio of different vertical and horizontal movement rates. For example, the condition that the slope slide blocks 1422 move by one unit length towards the direction of the forming mold core when the original second mold base 112 is pressed by one unit length can be changed into the condition that the slope slide blocks 1422 move by 1.5 unit lengths and the like towards the direction of the forming mold core when the second mold base 112 is pressed by one unit length.

In a rubber pad forming embodiment, when the slope fixed blocks 141 are screwed to the first mold base 111, the heights of the slope fixed blocks 141 (the heights of the fixed slopes 1411 on the slope fixed blocks 141 relative to the first mold base 111) can be changed by technical means of changing the slope fixed blocks 141 to other slope fixed blocks 141 with different heights or additionally arranging a gasket with a certain thickness between the bottom of each slope fixed block 141 and the first mold base 111 and then screwing the slope fixed blocks 141 to the first mold base 111, so that during assembly, the fixed slopes 1411 can be in earlier contact with the lateral slide surfaces 14221 of the corresponding slope slide block sets 142, the horizontal movement strokes of the slope slide blocks 1422 can be lengthened, and the lateral pressurization force to the rubber pad 13 can be further increased.

Figure 5A:
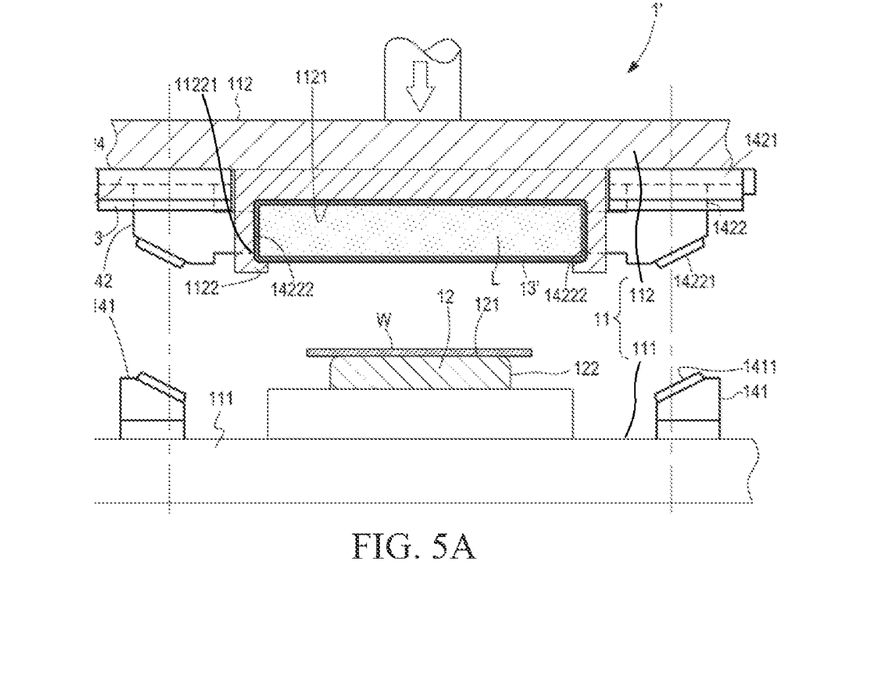
FIG. 5A is a front cross-sectional schematic diagram of a rubber bladder hydraulic forming mold with linkage type lateral auxiliary pressurization in a splitting and sheet placing state.
Figure 5B:
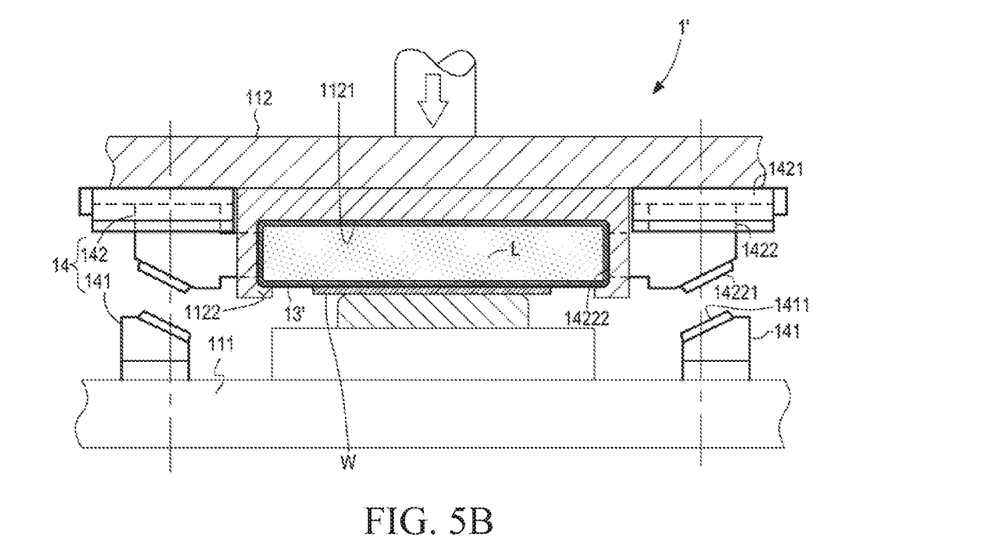
FIG. 5B is a front cross-sectional schematic diagram of a rubber bladder hydraulic forming mold with linkage type lateral auxiliary pressurization in a state that a rubber bladder is in contact with a sheet in an assembly process.
Figure 5C:
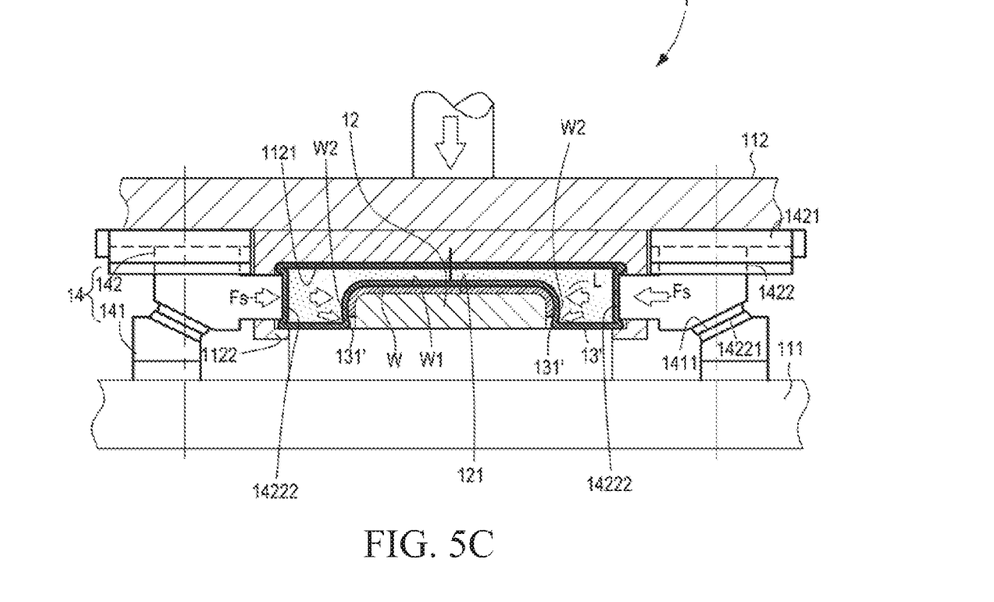
FIG. 5C is a front cross-sectional schematic diagram of a rubber pad forming mold with linkage type lateral auxiliary pressurization in an assembly molding, i.e. lateral pressure mechanism pressurization state.

As shown in FIG. 5A, FIG. 5B, and FIG. 5C, in another embodiment, a rubber bladder hydraulic forming mold 1' with linkage type lateral auxiliary pressurization is used for forming a sheet W comprising a base surface W1 and a side wall surface W2 bent at an angle to the base surface W1. The rubber bladder hydraulic forming mold 1' includes: a mold base set 11, a forming mold core 12, a rubber bladder 13', and a lateral pressure mechanism 14. The mold base set 11 comprises a first mold base 111 and a second mold base 112, which can be mutually assembled to mold the sheet W and can be mutually split to take out or embed the sheet W, where the second mold base 112 is provided with a mounting part 1121 facing the surface of the first mold base 111, a ring wall 1122 is arranged around the mounting part 1121, and the ring wall 1122 is provided with an opening 11221; the forming mold core 12 is arranged on the first mold base 111 corresponding to the mounting part 1121, where the forming mold core 12 has a base surface part 121 and a side surface part 122 bent at an angle to the base surface part 121, and the base surface part 121 is used for placement of the sheet W; the rubber bladder 13' for containing liquid L is arranged on the mounting part 1121, where the area occupied by the rubber bladder 13' covers the surface region of the sheet W facing the rubber bladder 13', and during assembly forming of the mold base set 11, the sheet W and the forming mold core 12 are sunken in the rubber bladder 13' to form the sheet W comprising the base surface W1 and the side wall surface W2; and the lateral pressure mechanism 14 comprises a plurality of slope fixed blocks 141 fixed to the first mold base 111 and slope slide block sets 142 arranged on the second mold base 112 and corresponding to the slope fixed blocks 141, where each slope fixed block 141 has a fixed slope 1411, each slope slide block set 142 comprises a slide rail groove 1421 and a slope slide block 1422, a pedestal of the slope slide block 1422 moves relative to the slide rail groove 1421 in the slide rail groove 1421, the slope slide block 1422 has a lateral slide surface 14221 corresponding to the fixed slope 1411 and a working surface 14222, and during assembly of the mold base set 11, the lateral slide surface 14221 abuts against the fixed slope 1411, and the pressurization force of the assembled mold is utilized to enable the skew component force of the fixed slope 1411 of the slope fixed block 141 to act on the slope slide block 1422 so as to enable the working surface 14222 to move towards the rubber bladder 13' and pass through the opening 11221 of the ring wall 1122 corresponding to the working surface 14222, so that a pressurization force Fs is applied to the rubber bladder 13' and is transferred to the side wall W2 of the sheet W.

In a rubber bladder hydraulic forming embodiment, the first mold base 111 can be used as an upper mold base, and the second mold base 112 can be used as a lower mold base.

In a rubber bladder hydraulic forming embodiment, the lateral slide surface 14221 of each slope slide block 1422 is a screwed oil-free wear-resistant block, the angle of the lateral slide surface 14221 can be finely adjusted during screwing, each fixed slope 1411 is a screwed oil-free wear-resistant block, and the angle of the fixed slope 1411 can be finely adjusted during screwing.

In a rubber bladder hydraulic forming embodiment, the fixed slopes 1411 of the slope fixed blocks 141 and the lateral slide surfaces 14221 of the slope slide blocks 1422 can be changed or adjusted to other different inclination angles so as to change the ratio of different vertical and horizontal movement rates.

In a rubber bladder hydraulic forming embodiment, when the slope fixed blocks 141 are screwed to the first mold base 111, the heights of the slope fixed blocks 141 (the heights of the fixed slopes 1411 on the slope fixed blocks 141 relative to the first mold base 111) can be changed by technical means of changing the slope fixed blocks 141 to other slope fixed blocks 141 with different heights or additionally arranging a gasket with a certain thickness at the bottom of each slope fixed block 141, so that during assembly, the fixed slopes 1411 can be in earlier contact with the lateral slide surfaces 14221 of the corresponding slope slide block sets 142, the horizontal movement strokes of the slope slide blocks 1422 can be lengthened, and a lateral pressurization force to the rubber bladder 13' can be further increased.

Figure 6A:
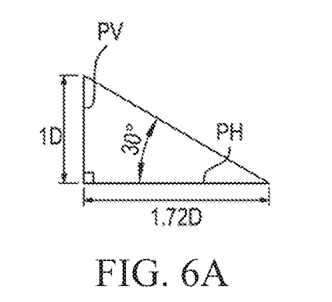
FIG. 6A to FIG. 6C are proportional relation between the vertical movement of a slope fixed block with a specific angle and the horizontal slide of a slope slide block with a specific angle of the present invention.
Figure 6B:
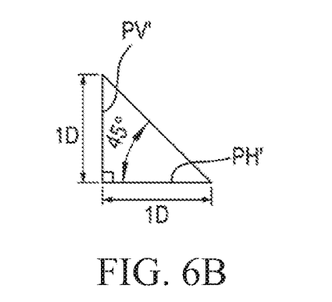
Figure 6C:
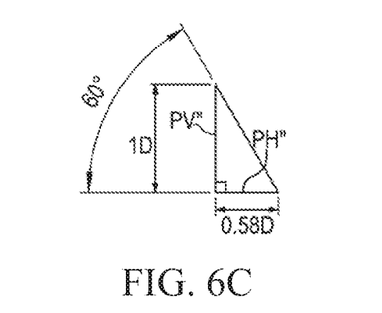

It is worth mentioning that the ratio of horizontal movement rates of the slope slide blocks 1422 are adjusted by changing the angles of the fixed slopes 1411 and the lateral slide surfaces 14221. Specifically as shown in FIG. 6A, in combination with FIG. 7, when both the inclination angle of the fixed slope 1411 and the lateral slide surface 14221 are 30 degrees, after the slope slide block 1422 and the slope fixed block 141 are in contact with each other and continue to vertically approach, the ratio of the vertical movement process PV of the slope fixed block 141 to the horizontal movement process PH of the slope slide block 1422 is 1:1.72, i.e., under the condition that the slope fixed block 141 is not moved, when the slope slide block 1422 vertically approaches to the slope fixed block 141 by one distance D, the slope slide block 1422 will horizontally move by 1.72 distances D at the same time. As shown in FIG. 6B, in combination with FIG. 7, when both the inclination angles of the fixed slope 1411 and the lateral slide surface 14221 are 45 degrees, after the slope slide block 1422 and the slope fixed block 141 are in contact with each other and continue to vertically approach, the ratio of the vertical movement process PV' of the slope fixed block 141 to the horizontal movement process PH' of the slope slide block 1422 is 1:1, i.e., under the condition that the slope fixed block 141 is not moved, when the slope slide block 1422 vertically approaches to the slope fixed block 141 by one distance D, the slope slide block 1422 will horizontally move by one distance D at the same time. As shown in FIG. 6C, in combination with FIG. 7, when both the inclination angles of the fixed slope 1411 and the lateral slide surface 14221 are 60 degrees, after the slope slide block 1422 and the slope fixed block 141 are in contact with each other and continue to vertically approach, the ratio of the vertical movement process PV" of the slope fixed block 141 to the horizontal movement process PH" of the slope slide block 1422 is 1:0.58, i.e., under the condition that the slope fixed block 141 is not moved, when the slope slide block 1422 vertically approaches to the slope fixed block 141 by one distance D, the slope slide block 1422 will horizontally move by 0.58 distance D at the same time.

Figure 7:
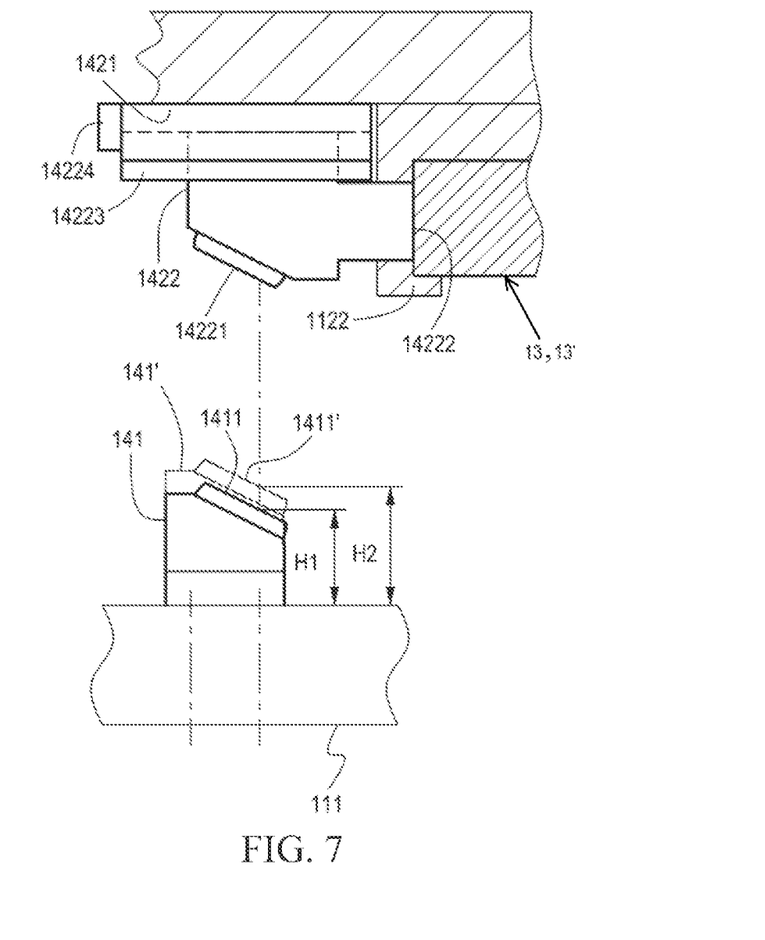
FIG. 7 is a schematic diagram of changing a slope fixed block of the present invention.

As shown in FIG. 7, the horizontal movement stroke of the slope slide blocks 1422 is changed by changing the heights of the fixed slopes 1411 relative to the first mold base 111, so that a lateral pressurization force to the rubber pad 13 or the rubber bladder 13' can be adjusted. Specifically as shown in FIG. 7, after the height H1 of the fixed slope 1411 on the slope fixed block 141 relative to the first mold base 111 is changed to the height H2 of the fixed slope 1411' on the slope fixed block 141' relative to the first mold base 111, during assembly, higher fixed slope 1411' can be in earlier contact with the lateral slide surface 14221 of the slope slide block set 142, so that the horizontal movement stroke of the slope slide block 1422 can be lengthened, and the lateral pressurization force to the rubber pad 13 or the rubber bladder 13' can be increased.

The above embodiments are merely illustrative of the principles, features and effects of the present invention, and are not intended to limit the scope of implementation of the present invention. Anyone who is familiar with the art can modify and change the above embodiments without departing from the spirit and scope of this creation. Any equivalent change and modification made using the contents disclosed by this creation should be covered by the scope of the following claims.

What is claimed is:

1. A rubber pad forming mold with a linkage type lateral auxiliary pressurization, used for forming a sheet comprising a base surface and a side wall surface bent at an angle to the base surface, wherein the rubber pad forming mold comprises:

a mold base set, comprising a first mold base and a second mold base which can be mutually assembled to mold the sheet and can be mutually split to take out the sheet, wherein the surface of the second mold base facing the first mold base is provided with a mounting part;

a forming mold core, arranged on the first mold base corresponding to the mounting part, wherein the forming mold core is provided with a base surface part and a side surface part bent at an angle to the base surface part, and the base surface part is used for placement of the sheet;

a rubber pad, arranged on the mounting part, wherein the area occupied by the rubber pad covers the surface region of the sheet facing the rubber pad, and during assembly forming of the mold base set, the sheet and the forming mold core are sunken in the rubber pad to model the sheet comprising the base surface and the side wall surface; and a lateral pressure mechanism, comprising a plurality of slope fixed blocks fixed to the first mold base and slope slide block sets arranged on the second mold base and corresponding to the slope fixed blocks, wherein each slope fixed block has a fixed slope, each slope slide block set comprises a slide rail groove and a slope slide block, a pedestal of the slope slide block moves relative to the slide rail groove in the slide rail groove, the top of the slope slide block is provided with a lateral slide surface corresponding to the fixed slope and a working surface, and during assembly of the mold base set, the lateral slide surface abuts against the fixed slope, and the pressurization force of the assembled mold is utilized to enable the skew component force of the fixed slope of the slope fixed block to act on the slope slide block so as to enable the working surface to move towards the rubber pad, so that a pressurization force is applied to the rubber pad and is transferred to the side wall of the sheet;

wherein when the mold base set presses the rubber pad to model the sheet, a hydraulic pressure for pressing the mold base set is utilized to link the slope slide block sets of the lateral pressure mechanism to move toward the rubber pad, and the pressurization force applied to the rubber pad is simultaneously generated.

2. The forming mold according to claim 1, wherein the first mold base is an upper mold base, and the second mold base is a lower mold base.

3. The forming mold according to claim 1, wherein the second mold base is provided with a ring wall surrounding the mounting part, the rubber pad is arranged in the region surrounded by the ring wall, and the ring wall is provided with an opening for the working surface to pass through in a position corresponding to the working surface.

4. The forming mold according to claim 1, wherein the lateral slide surface of each slope slide block is a screwed oil-free wear-resistant block, and the angle of the lateral slide surface can be finely adjusted during screwing.

5. The forming mold according to claim 4, wherein each fixed slope is a screwed oil-free wear-resistant block, and the angle of the fixed slope can be finely adjusted during screwing.

6. The forming mold according to claim 5, wherein the fixed slopes of the slope fixed blocks and the lateral slide surfaces of the slope slide blocks can be changed or adjusted to other different inclination angles so as to change different vertical and horizontal movement rates.

7. The forming mold according to claim 1, wherein each slope fixed block is screwed and fixed to the first mold base by a bolt, and the height of each slope fixed block relative to the first mold base can be adjusted during screwing.

8. The forming mold according to claim 7, wherein the height adjustment of the slope fixed blocks is that the slope fixed blocks are changed to other slope fixed blocks with different heights, or a gasket with a certain thickness is additionally arranged between the bottom of each of the slope fixed blocks and the first mold base, and then, the slope fixed blocks are screwed to the first mold base.

9. A rubber bladder hydraulic forming mold with linkage type lateral auxiliary pressurization, used for forming a sheet comprising a base surface and a side wall surface bent at an angle to the base surface, wherein the rubber bladder hydraulic forming mold comprises:

a mold base set, comprising a first mold base and a second mold base, wherein the first mold base and the second mold base can be mutually assembled to mold the sheet and can be mutually split to take out the sheet, the surface of the second mold base facing the first mold base is provided with a mounting part, a ring wall is arranged around the mounting part, and the ring wall is provided with an opening;

a forming mold core, arranged on the first mold base corresponding to the mounting part, wherein the forming mold core is provided with a base surface part and a side surface part bent at an angle to the base surface part, and the base surface part is used for placement of the sheet;

a rubber bladder for containing liquid, arranged on the mounting part, wherein the area occupied by the rubber bladder covers the surface region of the sheet facing the rubber bladder, and during assembly forming of the mold base set, the sheet and the forming mold core are sunken in the rubber bladder to mold the sheet comprising the base surface and the side wall surface; and a lateral pressure mechanism, comprising a plurality of slope fixed blocks fixed to the first mold base and slope slide block sets arranged on the second mold base and corresponding to the slope fixed blocks, wherein each slope fixed block has a fixed slope, each slope slide block set comprises a slide rail groove and a slope slide block, a pedestal of the slope slide block moves relative to the slide rail groove in the slide rail groove, the top of the slope slide block is provided with a lateral slide surface corresponding to the fixed slope and a working surface, and during assembly of the mold base set, the lateral slide surface abuts against the fixed slope, and the pressurization force of the assembled mold is utilized to enable the skew component force of the fixed slope of the slope fixed block to act on the slope slide block so as to enable the working surface to move towards the rubber bladder and pass through the opening of the ring wall corresponding to the working surface, so that a pressurization force is applied to the rubber bladder and is transferred to the side wall of the sheet;

wherein when the mold base set presses the rubber bladder to model the sheet, a hydraulic pressure for pressing the mold base set is utilized to link the slope slide block sets of the lateral pressure mechanism to move toward the rubber bladder, and the pressurization force applied to the rubber bladder is simultaneously generated.

10. The forming mold according to claim 9, wherein the first mold base is an upper mold base, and the second mold base is a lower mold base.

11. The forming mold according to claim 9, wherein the lateral slide surface of each slope slide block is a screwed oil-free wear-resistant block, the angle of the lateral slide surface can be finely adjusted during screwing, each fixed slope is a screwed oil-free wear-resistant block, and the angle of the fixed slope can be finely adjusted during screwing.

12. The forming mold according to claim 11, wherein the fixed slopes of the slope fixed blocks and the lateral slide surfaces of the slope slide blocks can be changed or adjusted to obtain other different inclination angles so as to change different vertical and horizontal movement rates.

13. The forming mold according to claim 9, wherein each slope fixed block is screwed and fixed to the first mold base by a bolt, and the height of each slope fixed block relative to the first mold base can be adjusted during screwing.

14. The forming mold according to claim 9, wherein the heights of the slope fixed blocks can be adjusted or changed to obtain slope fixed blocks with other different heights, or a gasket with a certain thickness is additionally arranged between the bottom of each of the slope fixed blocks and the first mold base, and then, the slope fixed blocks are screwed to the first mold base.

* * * * *